10# UNITED STATES PATENT OFFICE.

THOMAS HAROLD LEAMING AND THERESA MARIE SUSEMIHL, OF BUFFALO, NEW YORK, ASSIGNORS TO NATIONAL ANILINE & CHEMICAL COMPANY, INC., OF NEW YORK, N. Y., A CORPORATION OF NEW YORK.

DISAZO DYE.

1,363,886.

Specification of Letters Patent.  Patented Dec. 28, 1920.

No Drawing.  Application filed July 1, 1919.  Serial No. 307,896.

*To all whom it may concern:*

Be it known that we, THOMAS H. LEAMING and THERESA M. SUSEMIHL, citizens of the United States, residing at Buffalo, in the county of Erie, State of New York, have invented certain new and useful Improvements in Disazo Dye; and we do hereby declare the following to be a full, clear, and exact description of the invention, such as will enable others skilled in the art to which it appertains to make and use the same.

The present invention relates to a new disazo dye which is of value for dyeing silk, cotton, wool and other fibers, and as a union dye for fabrics composed of various mixtures of these fibers. The invention relates also to the dyed fabrics, or other materials, dyed with such new dyestuff.

The new dyestuff can be obtained by the diazotization of acet-p-phenylenediamin, or of p-nitranilin, coupling the disazo compound so obtained with one molecular proportion of 1.8-aminonaphthol-4-sulfonic acid (S-acid), coupling the resulting intermediate with another molecular proportion of the diazotized acet-p-phenylenediamin, or of the diazotized p-nitranilin, and then splitting off the acetyl groups, or reducing the nitro groups. The new dyestuff has in the free state the following probable formula:—

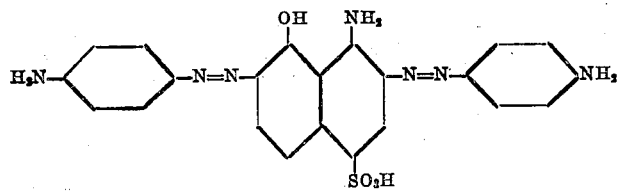

The following specific example will further illustrate the invention:

15.0 kg. of acet-p-phenylenediamin are dissolved in 400 liters of hot water, the solution cooled with ice, and 30 kg. of hydrochloric acid, sp. gr. 1.19 added, equivalent to 11.2 kg. anhydrous hydrochloric acid. The cool solution is now diazotized in the usual manner with 6.9 kg. of sodium nitrate. 24.0 kg. of 1.8-aminonaphthol-4-sulfonic acid are dissolved in 20 liters of 10% aqueous caustic soda, the solution diluted to 400 liters, acidified with acetic acid and cooled in an ice bath. The cool solution of diazotized acet-p-phenylenediamin is now added and is stirred until coupling is complete (about 12 hours). The precipitated monazo dye is now filtered off and dissolved in 1600 liters of water and 40 kg. of sodium carbonate. To the cool solution of the monazo dye there is now added a diazotized solution of 15.0 kg. acet-p-phenylenediamin (prepared as above), and the mixture stirred until the coupling is complete (about 3 hours). It is then salted out with common salt, preferably at 80° C. and filtered. The precipitated dye is now saponified (to split off the acetyl groups and replace the same by hydrogen) by heating to 90°–100° C. in 2400 liters of 10 per cent. caustic soda solution. At the end of this time (about 3–4 hours), hydrochloric acid is added until the reaction is almost neutral (*i. e.* slightly alkaline toward brilliant yellow test paper), and the product cooled and filtered.

The new disazo dye thus obtained, in the form of its sodium salt, is a brown powder soluble in water to give a blue-green solution, soluble in alcohol, and soluble in concentrated sufuric acid to form a green solution which on dilution with ice water, *i. e.*, water in the presence of ice, turns to a blue color and finally produces a blue precipitate.

The new dye dyes vegetable, animal and artificial fibers, such as cotton, wool, natural and artificial silk, etc., as well as union fabrics composed of mixtures of these fibers, producing in general greenish-black shades, which can be diazotized and developed on the fiber or fabric with beta-naphthol, or meta-phenylenediamin, or meta-tolylenediamin or resorcin, or other similar compounds, to give in general reddish to greenish shades of black which differ in tint from the self-shade.

The dyed materials produced either by the action of the new dyestuff itself, or by developing the new dyestuff on the fiber or fabric, as well as the new dyestuff itself, form a part of the present invention.

We claim:

1. The herein described new disazo dye having in the free state the following probable formula:

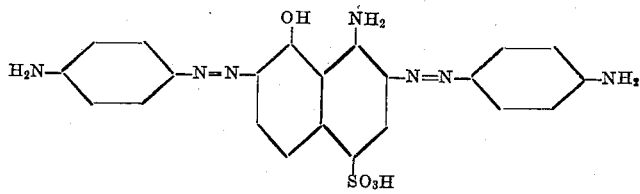

said dye, in the form of its sodium salts, being a brown powder soluble in water to give a blue-green solution, soluble in alcohol, soluble in concentrated sulfuric acid to give a green solution, and yielding upon reduction with stannous chlorid and hydrochloric acid p-phenylenediamin and tri-amino-8-naphthol-4-sulfonic acid; and dyeing cotton, wool, natural and artificial silk, or mixtures of the same, greenish shades of black which can be developed on the fiber.

2. The herein described new dyes obtainable by diazotizing the new disazo dye of claim 1 and developing with a developing agent.

3. The herein described new dye obtainable by diazotizing the new disazo dye of claim 1 and developing with m-toluylenediamin.

4. Materials dyed with the new disazo dye of claim 1.

5. Union goods dyed with the new disazo dye of claim 1.

6. Materials dyed with the new disazo dye of claim 1, said dye being developed on the material.

7. Union goods dyed with the new disazo dye of claim 1, said dye being developed on the material.

THOMAS HAROLD LEAMING.
THERESA MARIE SUSEMIHL.